United States Patent
Nonaka et al.

[11] Patent Number: 5,825,032
[45] Date of Patent: Oct. 20, 1998

[54] RADIOGRAPHIC APPARATUS AND IMAGE PROCESSING METHOD

[75] Inventors: Hideki Nonaka; Yutaka Endo, both of Utsunomiya; Noriyuki Kaifu, Hachioji; Isao Kobayashi, Atsugi; Toshio Kameshima, Sagamihara; Takashi Ogura, Tokyo, all of Japan

[73] Assignee: Canon Kabushiki Kaisha, Tokyo, Japan

[21] Appl. No.: 783,864

[22] Filed: Jan. 16, 1997

[30] Foreign Application Priority Data

Jan. 19, 1996 [JP] Japan ................................. 8-026115

[51] Int. Cl.6 .................................................. G03B 42/02
[52] U.S. Cl. .................................. 250/370.09; 378/98.8
[58] Field of Search .............................. 250/366, 370.09, 250/370.11; 378/98.8, 98.9, 98.12

[56] References Cited

U.S. PATENT DOCUMENTS

| | | | |
|---|---|---|---|
| 4,029,963 | 6/1977 | Alvarez et al. | 250/360 |
| 4,366,576 | 12/1982 | Annis | 378/146 |
| 4,511,799 | 4/1985 | Bjorkholm | 250/367 |
| 4,792,900 | 12/1988 | Sones et al. | 378/98.9 X |
| 5,099,128 | 3/1992 | Stettner | 250/370.09 X |
| 5,138,167 | 8/1992 | Barnes | 250/370.09 X |
| 5,278,754 | 1/1994 | Arakawa | 364/413.13 |
| 5,291,403 | 3/1994 | Ito | 364/413.23 |
| 5,376,801 | 12/1994 | Saotome et al. | 250/482.1 |
| 5,548,123 | 8/1996 | Perez-Mendez et al. | 250/370.09 X |
| 5,648,997 | 7/1997 | Chao | 378/98.12 X |

FOREIGN PATENT DOCUMENTS 0 089 665 A1  9/1983  European Pat. Off. .
42 01 116 A1  7/1993  Germany .

*Primary Examiner*—David P. Porta
*Attorney, Agent, or Firm*—Fitzpatrick, Cella, Harper & Scinto

[57] ABSTRACT

The present invention relates to a radiographic apparatus and an imaging processing method. The radiographic apparatus has first and second radiation detection units each of which converts information of a radiation image into an electrical signal, and which are arranged in the radiation incidence direction, and an image information combining unit for forming a combined image by combining the two pieces of radiation image information respectively obtained by the first and second radiation detection units.

19 Claims, 7 Drawing Sheets

RADIOGRAPHIC APPARATUS AND IMAGE PROCESSING METHOD

BACKGROUND OF THE INVENTION

1. Field of the Invention

The present invention relates to a radiographic apparatus using a solid state radiation detector which is sensitive to radiation and converts it into an electrical signal, and an image processing method.

2. Related Background Art

Conventionally, radiographic apparatuses and, especially, X-ray radiographic apparatuses, are used in the fields of medical radiographic apparatuses, industrial non-destructive examination, and the like.

The use mode of such apparatus will be explained below with reference to FIG. 1A. When X-rays radiated by an X-ray source 1 are irradiated onto an object S to be examined, the X-rays are intensity-modulated and scattered in correspondence with the structure of the object S to be examined due to interactions such as absorption, scattering, and the like in the object S to be examined, and reach a scintillator 2 as an X-ray image. In general, scintillation screen on which a phosphor is applied is used as the scintillator 2, and emits fluorescence having an intensity proportional to the X-ray irradiation amount. The X-ray image is converted into a visible image by the scintillator 2. An image-receiving means 3 generates an image corresponding to the received light amount, and the visible image generated by the scintillator 2 is converted by the image-receiving means 3 into an image corresponding to the light amount.

In an X-ray image detector, the image-receiving means normally comprises a film, and the X-ray image is recorded on the film as a latent image that gives a photographic density nearly proportional to the logarithm of the fluorescence amount. After the development process, the image recorded on the film is presented as a visible image, which is used in diagnosis, inspection, and the like. Especially, in medical radiography, in order to reduce the exposure dose on a patient as the object S to be examined as much as possible, a so-called double-sided emulsion film, i.e., a film on both the surfaces of which scintillators are formed, is used to receive light by the two surfaces, thereby improving the sensitivity and reducing the exposure dose.

In recent years, a technique of acquiring a digital image using, as the image-receiving means, a photoelectric conversion device constituted by a matrix of pixels, each of which consists of a very small photoelectric conversion element, switching element, and the like, has been developed. When this photoelectric conversion device is used, the following merits are expected.

Since an image can be directly acquired as digital data, image processing is facilitated, and correction of inappropriate radiographing conditions and emphasis of the region of interest are easy to attain. Using an image communication means such as a facsimile apparatus, diagnosis for patients in remote places without any expert doctors can be made by expert doctors in metropolitan hospitals. Furthermore, when digital image data is preserved in, e.g., a magnetooptical disk, the required preservation space can be greatly reduced as compared to preservation of films. Also, since previous images can be easily searched, reference images can be presented more easily as compared to search of films.

The radiation detector that uses the conventional film as the image-receiving means is required to realize both high sensitivity and high MTF (image sharpness) that are conflicting requirements. As described above, in the X-ray image detector that uses the conventional film, the double-sided emulsion film is used for the purpose of reducing the exposure dose on the patient as much as possible. However, the double-sided emulsion film suffers a problem of so-called crossover, i.e., that fluorescence emitted by the scintillator on the front surface side exposes the emulsion on the rear surface side. Since the film has a thickness of about 200 $\mu$m, if the crossover has occurred, fluorescence emitted by the scintillator on the front surface side causes exposure of the emulsion on the front surface side, is transmitted through the film while being diverged, resulting in exposure of the emulsion on the rear surface side as well. As a consequence, the obtained image is blurred, and the MTF lowers. Recently, a film system that can eliminate crossover has been developed, but cannot perfectly solve the above-mentioned problem, and the problem of slanted incidence remains unsolved.

Since X-rays B are radiated from the X-ray source as nearly a point light source, they are slantly incident on scintillators 2a and 2b at the end portions of the scintillators 2a and 2b, as shown in FIG. 1B. For this reason, X-ray images having different magnifications are irradiated onto the front and rear scintillators 2a and 2b, which are separated by at least the interval corresponding to the thickness (about 200 $\mu$m) of a film 4, and the corresponding front and rear emulsions are respectively exposed, as indicated by 4a and 4b.

When this film 4 is observed, two images having different magnifications are observed overlapping each other, and the MTF lowers especially at the end portion of the film 4. On the other hand, since a film image is an analog image, it cannot enjoy the above-mentioned merits of digitization.

On the other hand, as for the apparatus using the photoelectric conversion elements as image-receiving elements, an apparatus that can meet both the requirements of high sensitivity and high MTF has not been developed yet.

SUMMARY OF THE INVENTION

It is an object of the present invention to provide a radiographic apparatus which can solve the above-mentioned problems and can attain both high sensitivity and high MTF that are conflicting requirements, while sufficiently enjoying the merits of obtaining digital image data using a radiation detector, and an image processing method suitable for the apparatus.

Other objects of the present invention will become apparent from the following description of the embodiments.

DESCRIPTION OF THE PREFERRED EMBODIMENTS

Figure 1A:
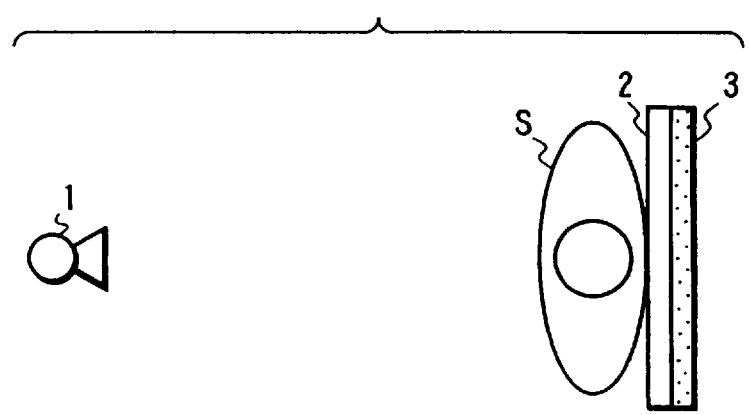
FIG. 1A is a view showing the arrangement of a conventional radiographic apparatus.
Figure 1B:
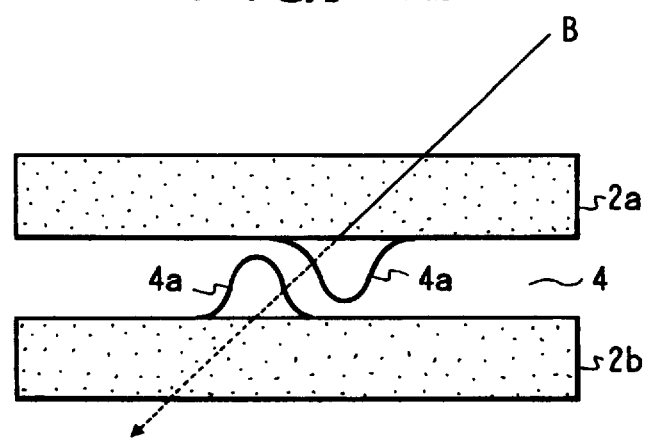
FIG. 1B is an explanatory view of slanted incidence of radiation on a screen film system.
Figure 2A:
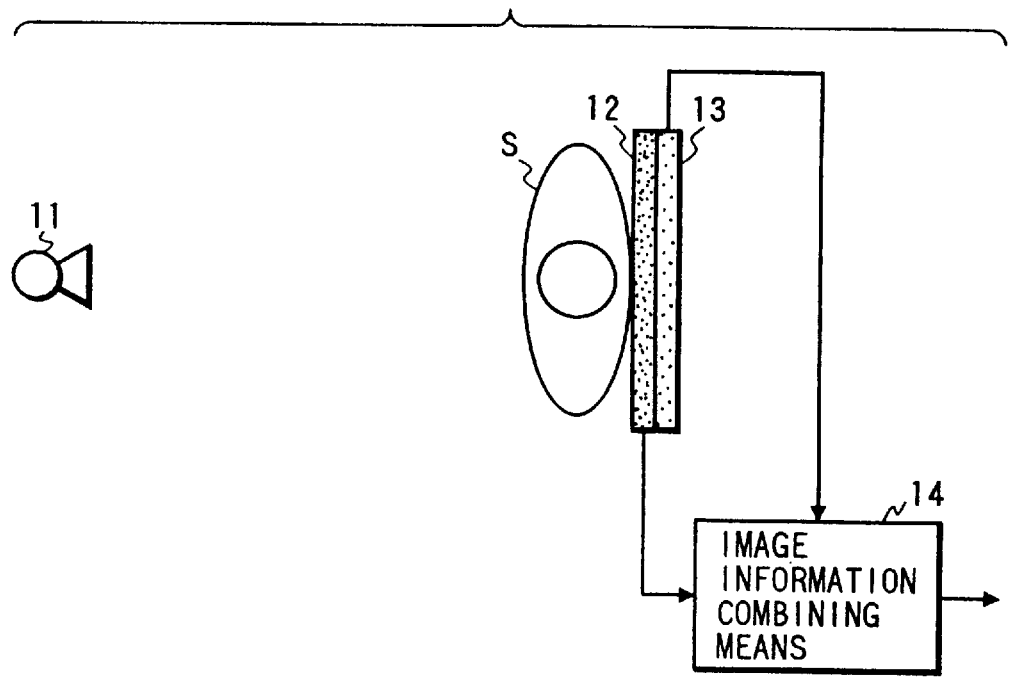
FIG. 2A is a view showing the arrangement according to the first embodiment of the present invention.

The present invention will be explained in detail hereinafter based on the illustrated embodiments. FIG. 2A shows the first embodiment. A first solid-state radiation detection means 12 and a second solid-state radiation detection means 13 are arranged in front of a radiation generation means 11, and the outputs from these detection means 12 and 13 are connected to an image information combining means 14 comprising, e.g., a workstation. An object S to be examined is located on the front surface of the first solid-state radiation detection means 12.

In this embodiment, each of the first and second solid-state radiation detection means 12 and 13 comprises a solid-state radiation detector, which is constituted by a two-dimensional matrix of elements, each of which directly has sensitivity to incoming photons, and converts the incident photons into an electrical signal corresponding to the detected number of photons. In general, the solid-state radiation detection means is an accumulation type device, which has charge accumulation elements corresponding in number to detection elements, and accumulates charges generated by the element portions. By reading out the accumulated charges later, image information can be obtained.

Upon executing radiography, when an operator turns on an irradiation switch, radiation is generated by the radiation generation means 11. The radiation is intensity-modulated and scattered in correspondence with the structure of the object S to be examined due to interactions such as absorption, scattering, and the like in the object S to be examined, and reaches the first solid-state radiation detection means 12 as a radiation image.

The radiation that carries the radiation image of the object S to be examined is received by the first solid-state radiation detection means 12, and image information is stored in the charge accumulation elements in the form of charges. Since the first solid-state radiation detection means 12 has a radiation quantum trapping efficiency less than 100%, a certain proportion of the incident radiation is transmitted through the first solid-state radiation detection means 12. The transmitted radiation is similarly detected and accumulated by the second solid-state radiation detection means 13, which is arranged on the rear surface, in the direction of incidence of radiation, of the first solid-state radiation detection means 12.

As described above, since the radiation that reaches the second solid-state radiation detection means 13 has undergone radiation quantum trapping by the first solid-state radiation detection means 12, and also interactions due to the substrates of the first and second solid-state radiation detection means 12 and 13, the sensitivity of the second solid-state radiation detection means 12 is set to be higher than that of the first solid-state radiation detection means 12.

Figure 2B:
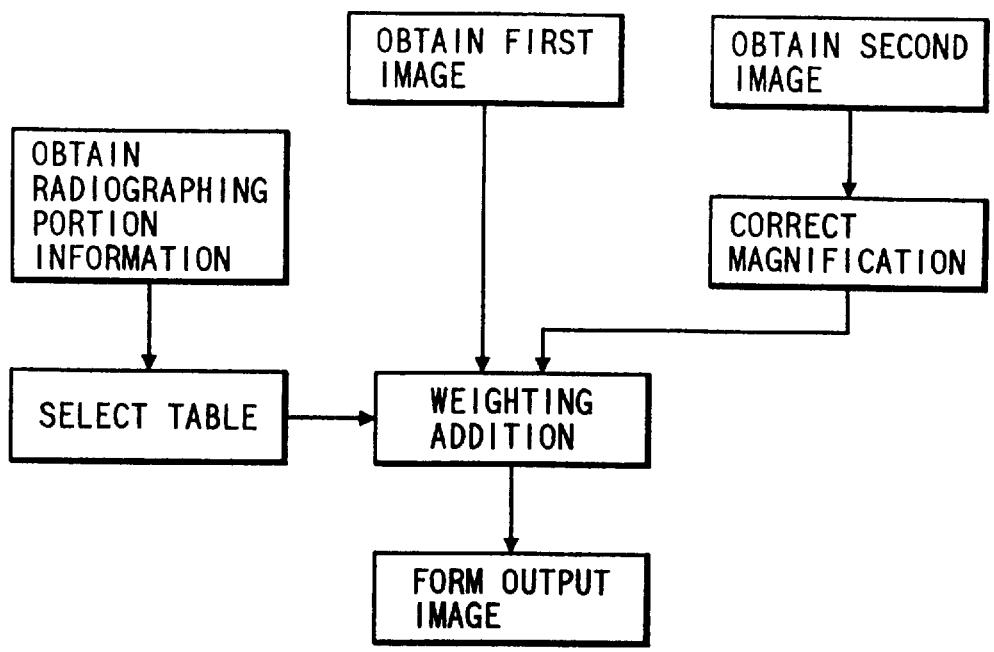
FIG. 2B is a flow chart showing the processing in an image information combining means.

Two pieces of image information acquired by the first and second solid-state radiation detection means 12 and 13 are output to the image information combining means 14, and are combined. The combined image is output to an interface to an external apparatus, an image display monitor, a printer, or the like. FIG. 2B is a flow chart showing the processing in the image information combining means 14, and first and second images in FIG. 2B respectively correspond to those acquired by the first and second solid-state radiation detection means 12 and 13. Since the second image has been enlarged due to the interval between the first and second solid-state radiation detection means 12 and 13, and has caused a geometrical deviation due to slanted incidence of radiation, the magnification of the second image is corrected. This correction is attained by calculations to be described below.

Figure 3:
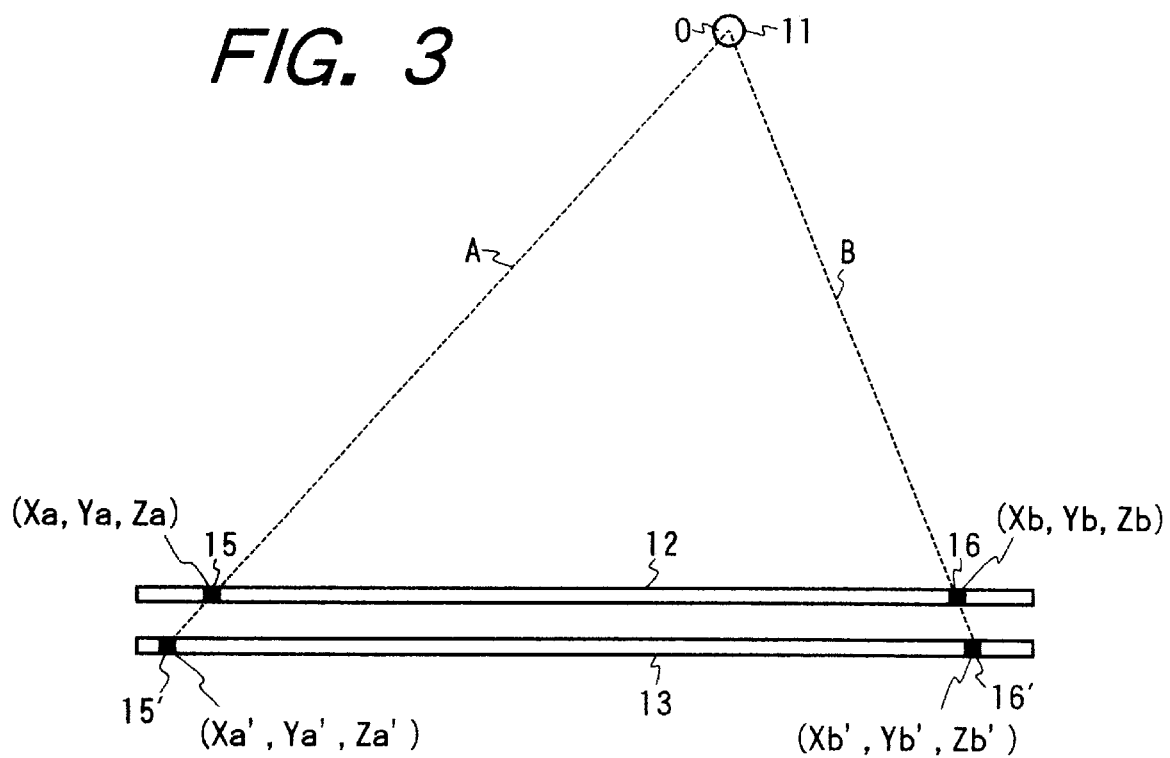
FIG. 3 is an explanatory view of the magnification correction method.

As shown in FIG. 3, masks 15 and 16 consisting of a material such as zinc having high radiation absorbency are arranged on at least two portions, that do not seriously influence radiographing, on the first solid-state radiation detection means 12. With this arrangement, the second solid-state radiation detection means 13 detects shadow images 15' and 16' of the masks 15 and 16. These shadow images 15' and 16' deviate from the masks 15 and 16 on the first solid-state radiation detection means 12 depending on the incident routes of radiation. Let $(Xa, Ya, Za)$ and $(Xb, Yb, Zb)$ be the spatial coordinates of the masks 15 and 16 on the first solid-state radiation detection means 12, and $(Xa', Ya', Za')$ and $(Xb', Yb', Zb')$ be the spatial coordinates of the shadow images 15' and 16' detected by the second solid-state radiation detection means 13. Then, a straight line A that connects the mask 15 and the shadow image 15' and a straight line B that connects the mask 16 and the shadow image 16' are respectively given by:

$$(X-Xa)/(Xa'-Xa) = (Y-Ya)/(Ya'-Ya) \quad (1)$$
$$= (Z-Za)/(Za'-Za)$$

$$(X-Xb)/(Xb'-Xb) = (Y-Yb)/(Yb'-Yb) \quad (2)$$
$$= (Z-Zb)/(Zb'-Zb)$$

Let s and t be the right-hand sides of equations (1) and (2), and $O(Xo, Yo, Zo)$ be the spatial coordinates of the intersection between the straight lines A and B, i.e., the radiation generation means 11. Then, the respective components of the spatial coordinates are described by:

$$Xo=(Xa'-Xa)s+Xa=(Xb'-Xb)t+Xb \quad (3)$$

$$Yo=(Ya'-Ya)s+Ya=(Yb'-Yb)t+Yb \quad (4)$$

$$Zo=(Za'-Za)s+Za=(Zb'-Zb)t+Zb \quad (5)$$

Solving equations (3) and (4) for s and t yields:

$$s=\{(Xb'-Xb)Ya-(Xb'-Xb)Yb-Xa(Yb'-Yb)+Xb(Yb'-Yb)\}/\{-(Xb'-Xb)(Ya'-Ya)+(Xa'-Xa)(Xb'-Yb)\} \quad (6)$$

$$t=\{-(Xa'-Xa)Ya+Xa(Ya'-Ya)-Xb(Ya'-Ya)+(Xa'-Xa)Yb\}/\{(Xb'-Xb)(Ya'-Ya)-(Xa'-Xa)(Yb'-Yb)\} \quad (7)$$

Substitutions of equations (6) and (7) into equations (3), (4), and (5) yield the spatial coordinates $O(Xo, Yo, Zo)$ of the radiation generation means 11:

$$Xo = \{-(Xb'-Xb)(Ya'-Ya)Yb + (Xa'-Xa)Ya(Yb'-Yb) - \quad (8)$$

-continued $$Xa(Ya' - Ya)(Yb' - Yb) + Xb(Ya' - Ya)(Yb' - Yb)\}/$$

$$\{-(Xb' - Xb)(Ya' - Ya) + (Xa' - Xa)(Yb' - Yb)\}$$

$$Yo = \{(Xa' - Xa)(Xb' - Xb)Ya - Xa(Xb' - Xb)(Ya' - Ya) - \quad (9)$$

$$(Xa' - Xa)(Xb' - Xb)Yb + (Xa' - Xa)Xb(Yb' - Yb)\}$$

$$\{-(Xb' - Xb)(Ya' - Ya) + (Xa' - Xa)(Yb' - Yb)\}$$

$$Zo = \{(Xb' - Xb)Ya - (Xb' - Xb)Yb - \quad (10)$$

$$Xa(Yb' - Yb) + Xb(Yb' - Yb)\}$$

$$(Za' - Za)/\{-(Xb' - Xb)(Ya' - Ya) + (Xa' - Xa)(Yb' - Yb)\}$$

A point (X, Y, Z) on the second solid-state radiation detection means 13 corresponding to an arbitrary point (X', Y', Z') on the first solid-state radiation detection means 12 is described by:

$$(X, Y, Z) = \{L'(X'-Xo)/L, L'(Y'-Yo)/L, (Z'-Zo)/L\} \quad (11)$$

For $$\begin{aligned} L'/L &= \{(Xa - Xo)^2 + (Ya - Yo)^2 + (Za - Zo)^2\}^{1/2}/ \quad (12) \\ &\quad \{(Xa' - Xo)^2 + (Ya' - Yo)^2 + (Za' - Zo)^2\}^{1/2} \\ &= \{(Xb - Xo)^2 + (Yb - Yo)^2 + (Zb - Zo)^2\}^{1/2}/ \quad (13) \\ &\quad \{(Xb' - Xo)^2 + (Yb' - Yo)^2 + (Zb' - Zo)^2\}^{1/2} \end{aligned}$$

Since Xa, Ya, Za, Xa', Ya', and Za' (or Xb, Yb, Zb, Xb', Yb', and Zb') are known, and Xo, Yo, and Zo have already been obtained, the point (X, Y, Z) can be uniquely determined. In this way, an arbitrary point (X, Y, Z) on the second solid-state radiation detection means 13 can be converted into a point on the first solid-state radiation detection means 12. Thus, the correspondence between the coordinates of the images obtained from the first and second solid-state radiation detection means 12 and 13 can be determined, and the deviation between the images of the first and second solid-state radiation detection means 12 and 13 can be corrected so that the coordinates of one image are adjusted to those of the other.

Medical radiation images require appropriate image densities and resolutions corresponding to specific portions to be radiographed. Even in one image, in, e.g., chest radiography, the mediastinum portion requires a higher image density since the transmission radiation dose is small, while the lung portion requires an image having a higher MTF. For this reason, different weighting coefficients upon combining a high-density image and a high-sharpness image are required in units of portions to be radiographed or in units of ranges in one image. Hence, upon executing radiographing, the operator inputs a portion to be radiographed such as the chest portion, abdomen, or the like using an input means (not shown), and then starts radiographing.

The combining ratios in units of pixels, i.e., weighting tables are prestored in units of portions to be radiographed. For example, upon chest radiographing, a given weighting table weights the first image as the output from the first solid-state radiation detection means 12, which is set to place an importance on the resolution so that a high sharpness is obtained in the lung portion, and weights the second image as the output from the second solid-state radiation detection means 13, which is set to place an importance on the sensitivity so that a high density is obtained in the mediastinum portion. An appropriate weighting table is selected in correspondence with the portion to be radiographed input by the operator. Images obtained by magnification-correcting the first and second images are weighted and added (weighted addition) in accordance with the combining ratios in units of pixels in the selected weighting table to obtain a single image.

Figure 4:
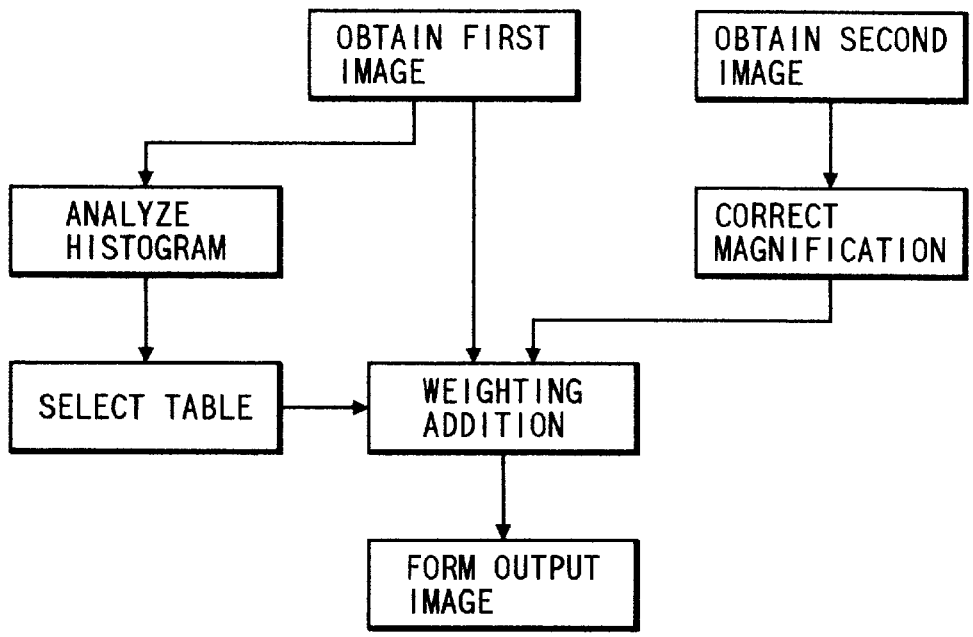
FIG. 4 is a flow chart showing the processing in the image information combining means.
Figure 5A:
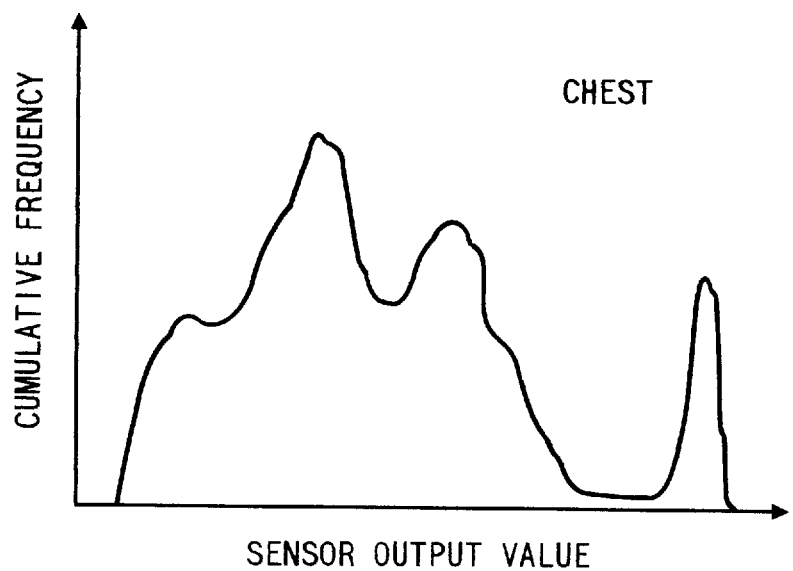
FIGS. 5A and 5B are graphs showing the difference in histogram depending on the portions to be radiographed.
Figure 5B:
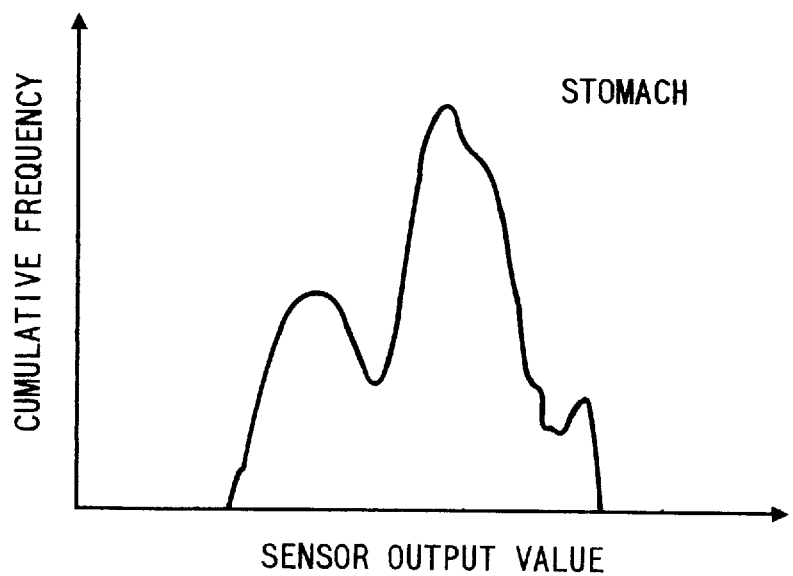

In the above method, a suitable weighting table is selected based on the portion to be radiographed input by the operator. Alternatively, as shown in the flow chart in FIG. 4, the portion to be radiographed can be specified by analyzing the histograms of the obtained images. Since histograms have unique patterns in correspondence with the portions to be radiographed, as shown in FIGS. 5A and 5B, the portion to be radiographed is specified by discriminating the histogram pattern. An appropriate weighting table is selected in accordance with the specified portion to be radiographed. The two images are weighted in accordance with the combining ratios in the selected weighting table, and the weighted images are added to each other.

Figure 6:
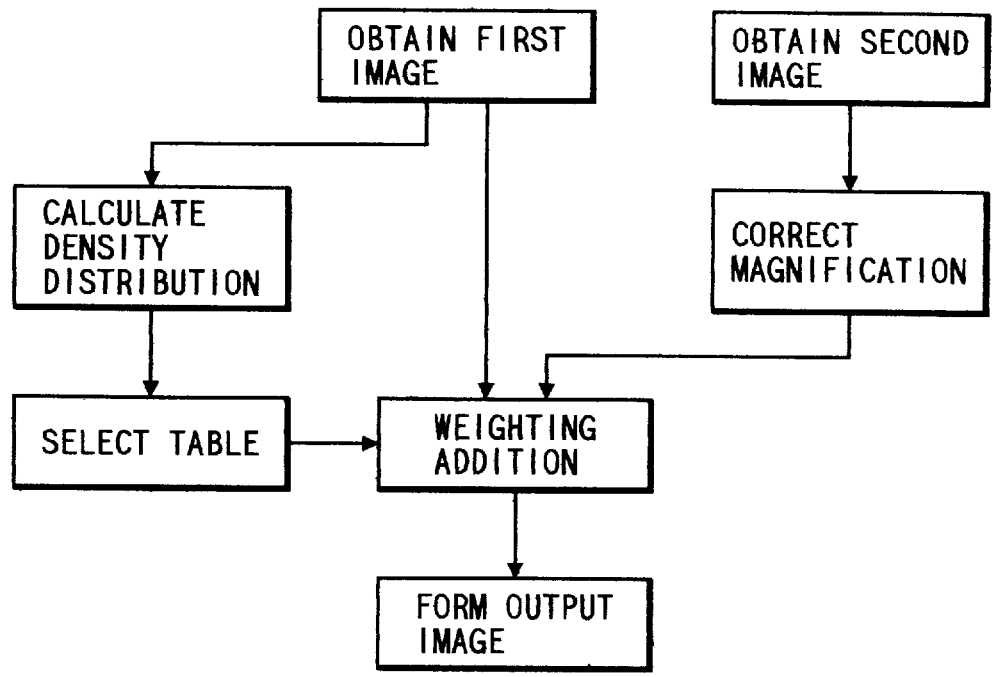
FIG. 6 is a flow chart showing the processing in the image information combining means.

Alternatively, as shown in the flow chart in FIG. 6, the values of the respective pixels may be read to calculate the distributions of low- and high-density portions, and a table that weights the density in the low-density portion and weights the MTF in the high-density portion may be formed to perform weighted addition.

With this method, since a radiation image having both a high density and high spatial resolution can be obtained as digital data, the merits of digital image data can be sufficiently enjoyed, and a decrease in MTF due to slanted incidence of radiation at the problem of the conventional double-sided emulsion film, can be prevented.

Figure 7:
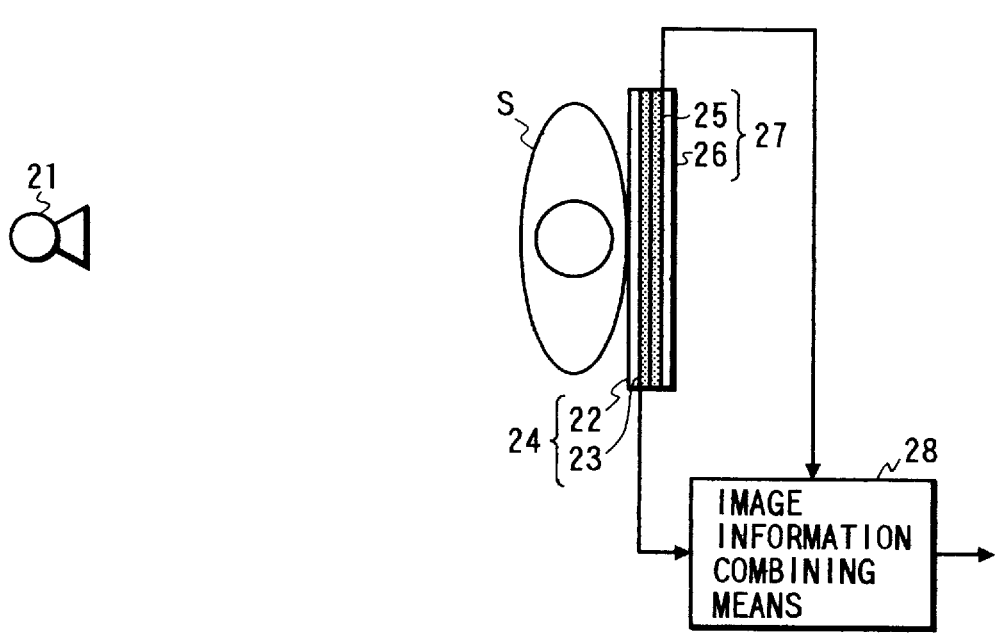
FIG. 7 is a view showing the arrangement according to the second embodiment of the present invention.
Figure 8:
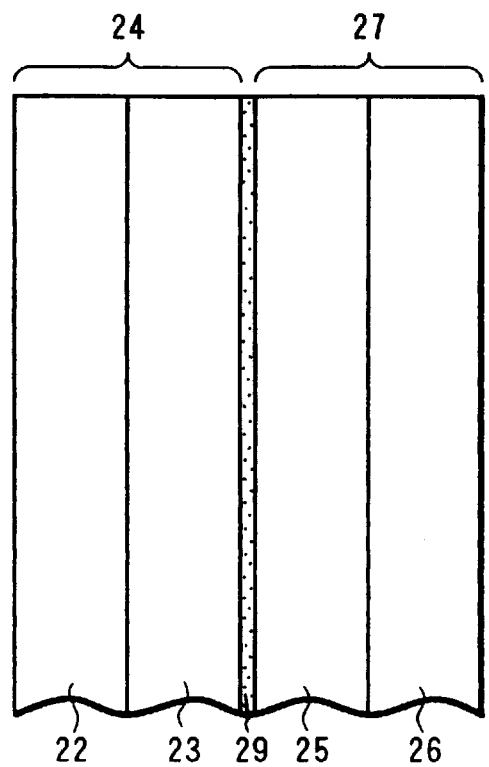
FIG. 8 is a sectional view of a solid-state radiation detection means with a light-shielding layer.

FIG. 7 shows the second embodiment. A first solid-state radiation detection means 24 comprising a first scintillator 22 and a first solid-state light detection means 23, and a second solid-state radiation detection means 27 comprising a second solid-state light detection means 25 and a second scintillator 26 are arranged in front of a radiation generation means 21. The solid-state radiation detection means 24 and 27 comprise combinations of the scintillators 22 and 26 which absorb radiation and emit visible light corresponding to the absorbed energy, and the solid-state light detection means 23 and 25 each of which comprises a two-dimensional matrix of photoelectric conversion elements that convert the visible light into an electrical signal corresponding to the intensity of the light. The outputs from the first and second solid-state radiation detection means 24 and 27 are connected to an image information combining means 28, and an object S to be examined is located on the front surface of the second scintillator 22. Furthermore, as shown in FIG. 8, a light-shielding layer 29 which transmits radiation but does not transmit light is arranged between the first and second solid-state radiation detection means 24 and 27.

Upon executing radiography, when the operator turns on an irradiation switch (not shown), the radiation generation means 21 generates radiation. The radiation is intensity-modulated and scattered in correspondence with the structure of the object S to be examined due to interactions such as absorption, scattering, and the like, and reaches the first solid-state radiation detection means 24 as a radiation image.

The radiation that carries the radiation image of the object S to be examined is absorbed by the first scintillator 22, which emits fluorescence corresponding to the absorbed radiation. This fluorescence is detected by the first solid-state light detection means 23, and image information is converted into charges by the photoelectric conversion effect. The converted charges are accumulated in charge accumulation elements arranged adjacent to the photoelectric conversion elements.

Since the first solid-state radiation detection means 24 has a radiation quantum trapping efficiency less than 100%, a given proportion of the incident radiation is transmitted through the first solid-state light detection means 23. The transmitted radiation is similarly detected and accumulated by the second solid-state light detection means 25 and the second scintillator 26, which are arranged on the rear surface of the first solid-state light detection means 23 with respect to the radiation incidence route.

Note that the light-shielding layer 29 can prevent the second solid-state light detection means 25 from receiving the fluorescence generated by the first scintillator 22, and can similarly prevent the first solid-state light detection means 23 from receiving the fluorescence generated by the second scintillator 26, thus perfectly solving the problem of crossover between the two scintillators 22 and 26. Note that other arrangements and operations are the same as those in the first embodiment.

Note that the scintillators and the solid-state light detection means are arranged in the order of the scintillator 22, the first solid-state light detection means 23, the second solid-state light detection means 25, and the second scintillator 26 with respect to the radiation incident route. However, this layout is merely one embodiment, and the present invention is not limited to this.

As in the conventional screen film system, when the first scintillator 22 on the front surface side uses a middle-sensitivity, high-sharpness scintillator, and the second scintillator 26 on the rear surface side uses a high-sensitivity scintillator, two radiation images having different characteristics can be obtained by single irradiation.

Figure 9:
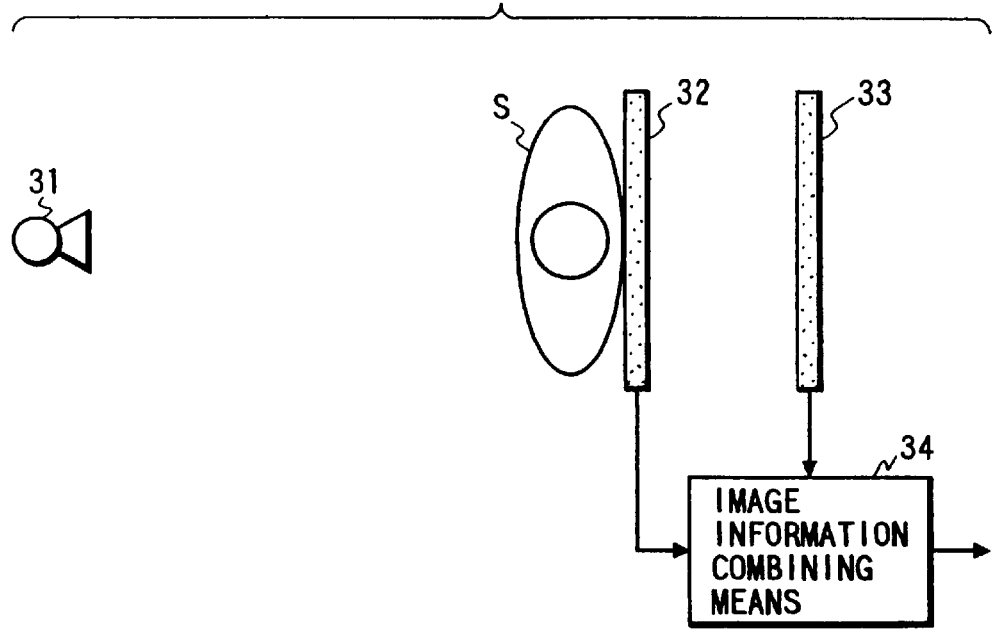
FIG. 9 is a view showing the arrangement according to the third embodiment of the present invention.

FIG. 9 shows the third embodiment. A first solid-state radiation detection means 32 and a second solid-state radiation detection means 33 are arranged in front of a radiation generation means 31. The first and second solid-state radiation detection means 32 and 33 are arranged via a space corresponding to a predetermined distance. An object S to be examined is located on the front surface of the first solid-state radiation detection means 32, and the outputs from the first and second solid-state radiation detection means 32 and 33 are connected to an image information combining means 34. Note that the solid-state radiation detection means 32 and 33 are the same as those used in the first embodiment or the second embodiment.

The radiation transmitted through the object S to be examined is detected by the first solid-state radiation detection means 32, and the radiation transmitted through the first solid-state radiation detection means 32 is detected by the second solid-state radiation detection means 33. The space is present between the first and second solid-state radiation detection means 32 and 33 and, hence, an image from which scattering radiation generated when radiation is transmitted through the object S to be examined and the first radiation detection means 33 is removed due to the Groedel's effect is generated. Images generated by the two detection means 32 and 33 are combined by the image information combining means 34.

Figure 10:
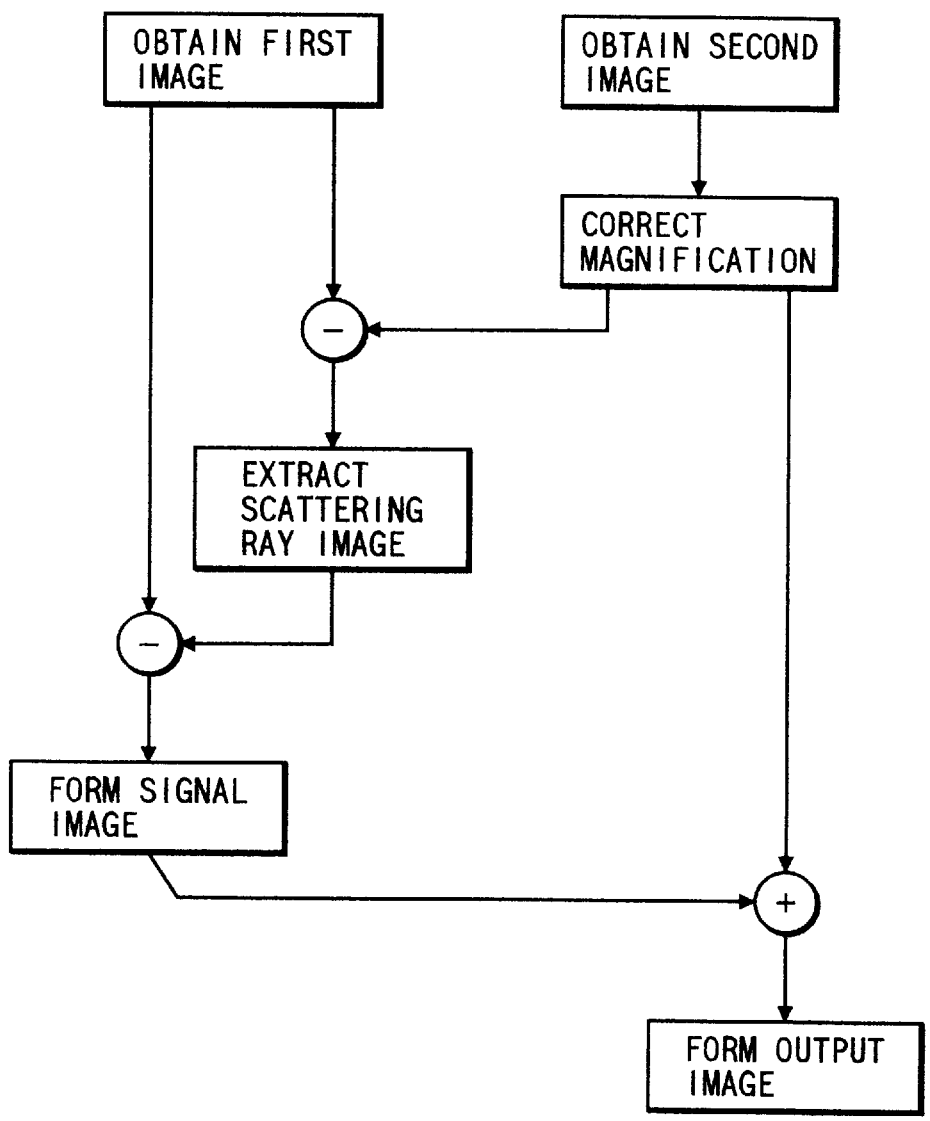
FIG. 10 is a flow chart showing the processing in the image information combining means.

FIG. 10 is a flow chart showing the processing in the image information combining means in this embodiment. As in the first embodiment, since the second image has been enlarged due to the interval between the first and second solid-state radiation detection means 32 and 33, and has caused a geometrical deviation due to slanted incidence of radiation, the second image is coordinate-converted to corresponding pixel positions on the first solid-state radiation detection means 32 using the same technique as described above. The second image is one from which scattering lines are removed due to the Groedel's effect, and by calculating the difference between the first image and the image obtained by coordinate-converting the second image, scattering ray components are extracted to obtain a scattering ray image.

Subsequently, the difference between the first image and the scattering ray image is calculated to obtain an image from which scattering rays are removed. Furthermore, the sum of the calculated image and the image obtained by the second solid-state radiation detection means 33 is calculated to obtain an output image. Note that other arrangements and operations are the same as those in the first and second embodiments.

With the above-mentioned technique, since a radiation image having both a high density and high spatial resolution can be obtained as digital image data, the merits of digital image data can be sufficiently enjoyed, and a radiation image with a high sharpness, from which scattering rays are removed, can be acquired. As described above, since the first and second radiation detection means are arranged to overlap each other in the radiation incidence direction, two different images having different image qualities can be concurrently obtained by single irradiation. When signal processing for combining these two images into one image is performed, a radiation image having predetermined characteristics can be obtained. Furthermore, since the obtained image is digital image, the merits of digital image data can be sufficiently enjoyed.

Also, when the image magnification in the second solid-state radiation detection means is calculated based on the two image data, the image data obtained by the second radiation detection means is subjected to magnification correction, and thereafter, the image combining processing is performed, a decrease in MTF due to slanted incidence of radiation as the problem of the double-sided emulsion film can be prevented.

Furthermore, when each radiation detection means comprises a combination of a light detector and a scintillator, a light-shielding layer is formed between the first and second radiation detection means, crossover between the two scintillators can be perfectly eliminated.

When the first and second radiation detection means are arranged to have a gap therebetween, and scattering ray components are extracted from the output images of the two detection means and are corrected, a radiation image with a high sharpness can be obtained.

When the coordinate difference between the two pieces of image information from the first and second radiation detection means, which are arranged at the front and back positions with respect to the radiation incidence direction, is obtained from the position information of a specific image in at least one image information, the coordinate difference such as a magnification difference between two images can be accurately obtained by a simple arrangement, and such information can be preferably used in, e.g., image combining processing later.

When scattering ray information in at least one of the two pieces of image information from the first and second radiation detection means, which are arranged at the front and back positions with respect to the radiation incidence direction, is extracted using these two pieces of image information, the scattering ray components in the images can be accurately extracted by a simple arrangement, and can be corrected in, e.g., image combining processing later. Therefore, the image combining processing suffering less error components can be preferably realized.

What is claimed is:

1. A radiographic apparatus comprising:

first and second radiation detection units for converting information of a radiation image into an electrical signal, said first and second radiation detection units being arranged one after the other along a radiation incidence direction; and an image information combining unit for forming a combined image by combining two pieces of radiation image information respectively obtained by said first and second radiation detection units, said information combining unit forming the combined image on the basis of a coordinate difference between the two pieces of radiation image information obtained by position information of a specific image in at least one of the two pieces of image information.

2. An apparatus according to claim 1, wherein at least one of sensitivity and spatial resolution characteristics of said first radiation detection unit is different from that of said second radiation detection unit.

3. An apparatus according to claim 2, wherein said image information combining unit combines the two pieces of radiation image information respectively obtained by said first and second radiation detection units at combining ratios determined in advance in units of portions of a radiation image.

4. An apparatus according to claim 1, wherein said image information combining unit executes combining of the two pieces of image information to change a density and an image sharpness of the combined image in units of portions of a radiation image.

5. An apparatus according to claim 1, wherein said first and second radiation detection units are arranged to have a gap therebetween.

6. An apparatus according to claim 1, further comprising an index member used for detecting a coordinate difference between the two pieces of radiation image information respectively obtained by said first and second radiation detection unit.

7. An apparatus according to claim 1, wherein said first radiation detection unit comprises a first scintillator for absorbing radiation and emitting visible light corresponding to energy of the absorbed radiation and a first light detection element for detecting the visible light from said first scintillator, and said second radiation detection unit comprises a second scintillator for absorbing radiation and emitting visible light corresponding to energy of the absorbed radiation and a second light detection element for detecting the visible light from said second scintillator.

8. An apparatus according to claim 7, wherein at least one of sensitivity and sharpness characteristics of said first scintillator is different from that of said second scintillator.

9. An apparatus according to claim 7, further comprising a light-shielding portion arranged between said first and second radiation detection units.

10. An apparatus according to claim 1, wherein said image information combining unit corrects a coordinate difference between the two pieces of image information before combining the two pieces of image information.

11. An apparatus according to claim 1, wherein said image information combining unit removes scattering ray information in the image information before combining the two pieces of image information.

12. An image processing method comprising the steps of:

acquiring two pieces of radiation image information from first and second radiation detection units arranged one after the other along a radiation incidence direction; and combining the two pieces of radiation image information obtained by the first and second radiation detection units, said combination being performed on the basis of a coordinate difference between the two pieces of radiation image information obtained by position information of a specific image in at least one of the two pieces of image information.

13. A method according to claim 12, wherein the step of acquiring the radiation image information is executed while at least one of sensitivity and spatial resolution characteristics of said first and second radiation detection units is set to be different from each other.

14. A method according to claim 12, wherein the step of combining the image information is executed after a coordinate difference between the two pieces of radiation image information is corrected.

15. A method according to claim 12, wherein the step of combining the image information is executed after scattering ray information in the image information is removed.

16. An image processing method comprising the steps of:

acquiring two pieces of radiation image information from first and second radiation detection units arranged one after the other along a radiation incidence direction; and detecting a coordinate difference between the two pieces of radiation image information respectively obtained by the first and second radiation detection units, wherein said detecting step is executed on the basis of position information of a specific image in at least one image information.

17. An image processing method comprising the steps of:

acquiring two pieces of radiation image information from first and second radiation detection units arranged one after the other along a radiation incidence direction, said first and second radiation detection units being arranged to define a space between them with no member interposed in the space; and detecting scattering ray information in the image information using the two pieces of radiation image information respectively obtained by said first and second radiation detection units.

18. A method according to claim 17, wherein the step of detecting the scattering ray information is executed in at least one image information.

19. A method according to claim 18, further comprising the step of removing the scattering ray information from said at last one image information.

* * * * *